Figure 1:
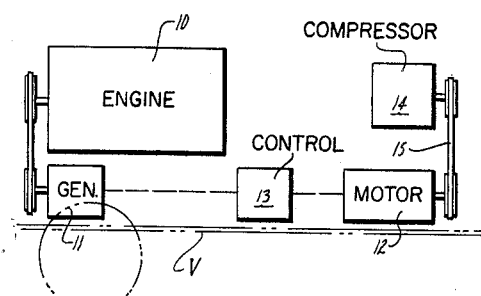

Dec. 28, 1965    L. BLOCK    3,226,619
GENERATOR-FED A.C. MOTOR CONTROL WITH CONVERTIBLE-POLE
MOTOR AND STANDBY SOURCE
Filed Jan. 6, 1964    2 Sheets-Sheet 1

INVENTOR.
LEO BLOCK

BY
*Fleck & Swain*
Attorneys

United States Patent Office 3,226,619
Patented Dec. 28, 1965

3,226,619
GENERATOR-FED A.C. MOTOR CONTROL WITH CONVERTIBLE-POLE MOTOR AND STANDBY SOURCE
Leo Block, Monterey Park, Calif., assignor, by mesne assignments, to Transicold Corporation, Montebello, Calif., a corporation of Delaware
Filed Jan. 6, 1964, Ser. No. 336,001
1 Claim. (Cl. 318—106)

This invention relates to a system for maintaining an electrically powered compressor within a predetermined, optimum, safe speed range notwithstanding wide variations of frequency and voltage in the power supply. More particularly, this invention pertains to a compressor control system particularly applicable for transport refrigeration systems where the electric power supply varies with speed of the transport.

In transport refrigeration systems it has long been preferred to operate the refrigeration compressor by means of an electric motor. When a refrigerated truck is at its loading dock or a refrigerated railway car is on a siding it is then a simple matter to take power from an electrical outlet.

In over-the-road operation power is provided by the vehicle's alternator or generator. The simplest connection between alternator and compressor motor gives the latter a speed proportional to the former which itself depends on engine speed. Thus, as engine speed increases, so too will the generated voltage and frequency increase. Where an electric motor, e.g., an induction motor, is connected to the generating means to drive the compressor, the motor speed will increase with an increase in frequency or voltage.

The engine of the vehicle is normally required to operate over a wide range of speeds, for example from an idling speed to a speed comparable to 65 miles an hour. At extreme low engine speeds the compressor capacity is very low. At high engine speeds the compressor must be protected against operation at speeds in excess of its design speed. Furthermore, operation of the compressor over the full range of engine speeds obviously results in considerable inefficiencies of operation so as to place increased horsepower demands upon the engine.

An increased horsepower requirement results directly in increasing fuel consumption of the truck. This can be significant. Horsepower driving a fan varies with the speed cubed. Where an evaporator and condenser fan require one-quarter horsepower at idling speeds of 600 r.p.m. and the refrigeration system is set to cut out at 2400 r.p.m., the fan horsepower at 2400 r.p.m. will be on the order of 16 horsepower.

Therefore it is a general object of the invention to provide an improved compressor power system.

Another object of the invention is to provide a transport refrigeration compressor power system wherein the compressor is electrically powered from a variable frequency source and arranged to operate within an optimum speed range notwithstanding wide variations in voltage and frequency of the source as the vehicular speed varies.

As is known, the size of the alternator or other generating means required to operate an electric motor is determined by the starting characteristics of the motor. It is therefore a further object of the invention to provide an electrically powered compressor system wherein the starting characteristics of the motor are such as to minimize the demands on the alternator.

Figure 2:
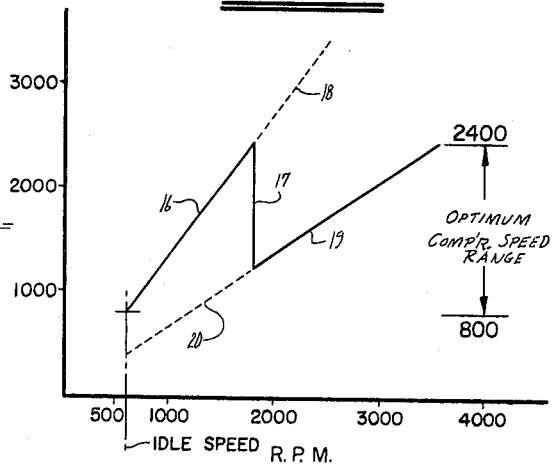
Figure 3A:
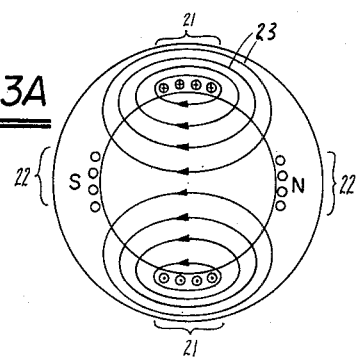
Figure 3B:
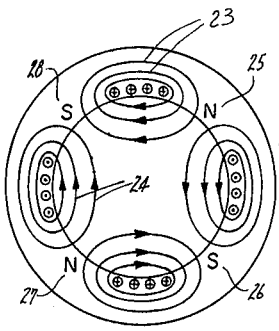
Figure 4A:
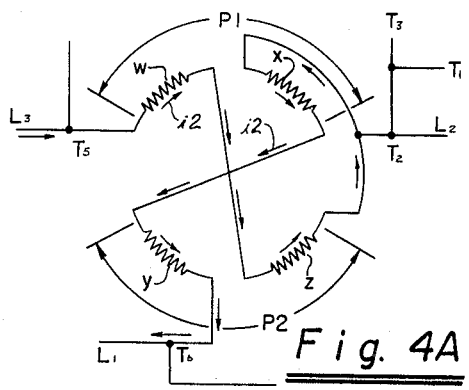
Figure 4B:
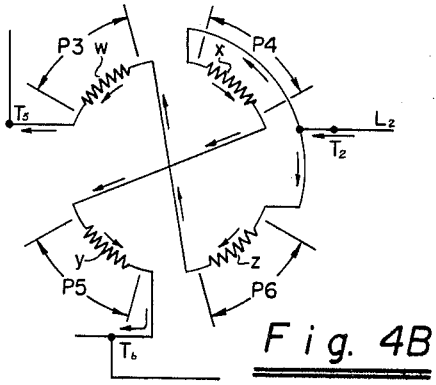
Figure 5:
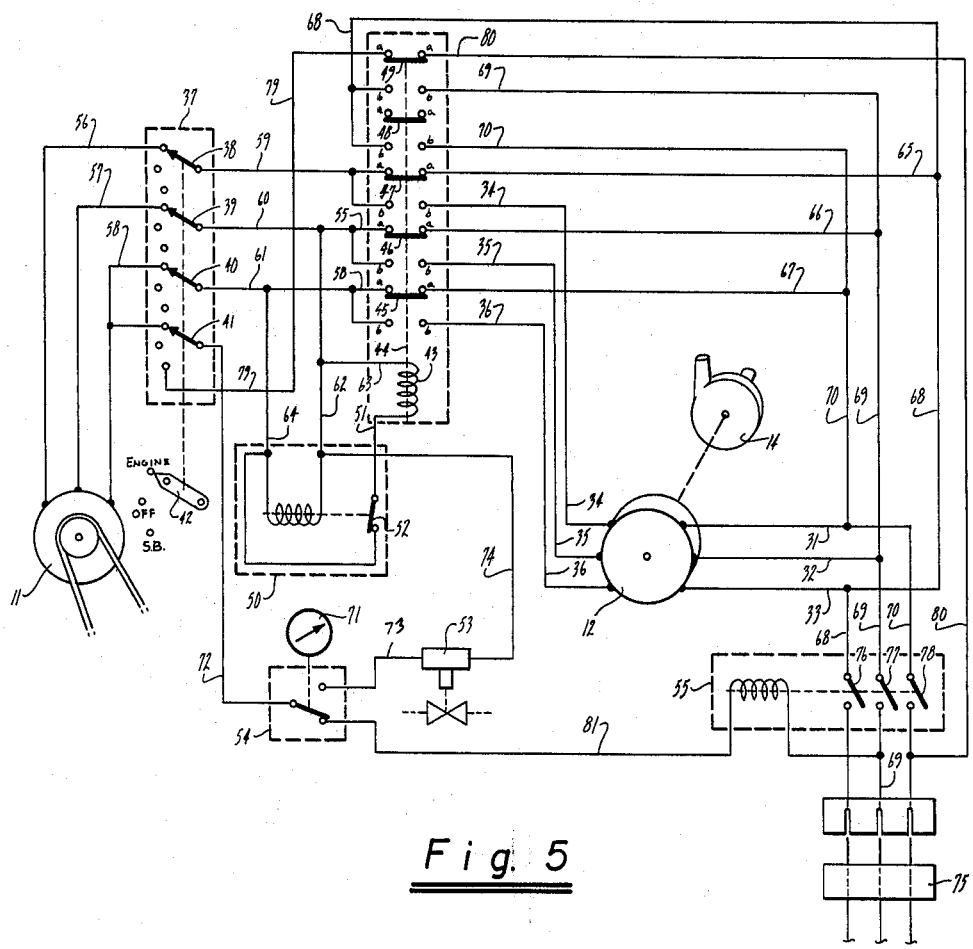

These and other objects of the invention will become more clearly apparent from the following description of a preferred embodiment when taken with the accompanying drawings wherein:

FIGURE 1 is a diagrammatic showing of a system according to the invention;
FIGURE 2 is a graph illustrative of compressor performance in accordance with the invention;
FIGURES 3A and 3B schematically show 2-pole and 4-pole magnetic flux patterns in a motor;
FIGURES 4A and 4B are schematic diagrams showing, for one phase of a polyphase induction motor, wiring for 2-pole and 4-pole operation thereof;
FIGURE 5 shows an electrical system according to the invention.

In general, a compressor system is provided including a compressor and a multiple-speed electric motor driving the compressor. The motor is driven by a variable frequency or voltage source. The motor is of the type having relatively low and high speeds of operation for a given frequency. Generating means are provided which supply a variable frequency A.C. voltage to the motor wherein the frequency ranges between first and second widely separated limits. The motor is arranged with respect to the generator means to be driven by the latter at a speed proportional to the generated frequency or voltage. Thus, its speed varies with variations in frequency or voltage supplied to it. Switching means are provided operably coupled and responsive to operation of the generator means at a predetermined frequency lying somewhere between the above limits to switch the motor to low-speed operation. The predetermined frequency at which the switching means serves to change motor speed is selected to substantially represent the upper speed-limit of optimum compressor operation.

A system according to the invention is shown in FIGURE 1. The system includes an engine 10 of a vehicle V such as a refrigerator truck, for example. A generating means 11, such as an alternator of conventional design, is belt driven from the engine. Generator means 11 operates an electric motor 12, preferably a three-phase induction motor, via control means 13. Means 13 serves to sense a predetermined speed of engine 10 whereby motor 12 is switched to low-speed operation. Motor 12 is arranged to drive a compressor 14 as by means of the belt and pulley arrangement 15, or other direct drive.

Control means 13 is operably coupled and responsive to operation of the generator means of a predetermined level of operation whereby it switches motor 12 to low-speed operation.

A preferred embodiment of the system, constructed as described further below, provided the operating characteristic shown in the graph of FIGURE 2. A compressor was operated within an optimum speed range between 800 and 2400 r.p.m. At an engine idling speed on the order of 600 r.p.m. minimum compressor speed was obtained as shown by the line 16. When engine speed was raised to around 2400 r.p.m., corresponding substantially to 35 miles per hour, the compressor motor reached the upper limit of optimum capacity and was dropped to low-speed operation along line 17. From inspection it can be seen that thereafter, operation of the compressor was continued so as to remain well within the optimum range, even though the electric motor was being driven at its lower speed.

By comparison, dashed line 18 represents a continuation of line 16 to indicate the further resultant increase in compressor speed for a similar system utilizing a single-speed motor.

After switching the compressor motor to low-speed operation, engine speed continued to increase to a speed on the order of 65 miles an hour which occurred at approximately 3600 r.p.m. This operation is shown along line 19. It is therefore seen that operation of the compressor was contained within a designated optimum speed range.

Again, by comparison, dashed line 20 represents the range of operation required of a similar system having operating characteristics for operating on line 19 when using a single-speed motor.

It should therefore be observed that the characteristics of a system having a single-speed motor driving a compressor and arranged to perform along line 16–18 suffers from the disadvantage of overspeeding at high engine speeds. On the other hand a single-speed motor arranged to perform along line 19–20 has extremely low compressor capacity at low engine speeds. These problems have been solved in the past by employing voltage regulators and other relatively more expensive equipment. Rather than incur the expense, one manufacturer of an A.C. system causes the motor to cut out completely at high speed to avoid damaging the compressor thereby sacrificing refrigeration entirely at that point, while settling for minimum refrigeration at low speed. A table illustrating the relationship between engine speed and compressor speed for the present system is shown below.

*Table I*

| Engine Speed, R.P.M. | Alt'r Speed | C.Y.C. | Volts | Motor Speed | | Comp'r Speed |
|---|---|---|---|---|---|---|
| | | | | High (2 pole) R.P.M. | Low (4 pole) | |
| 600 | 600 | 20 | 80 | 1,200 | | 800 |
| 1,200 | 1,200 | 40 | 160 | 2,400 | | 1,600 |
| 1,800 | 1,800 | 60 | 240 | 3,600 | (1,800) | 2,400 |
| 2,400 | 2,400 | 80 | 320 | | 2,400 | 1,600 |
| 3,000 | 3,000 | 100 | 400 | | 3,000 | 2,000 |
| 3,600 | 3,600 | 120 | 480 | | 3,600 | 2,400 |

As will be further described below, there is provided a two-speed motor 12 of the type having winding means providing a first pair of magnetic field poles serving to operate the motor at high-speed operation for a given frequency, and having means serving to electrically add a second pair of magnetic field poles to the first pair in order to operate the motor at a lower speed for the same given frequency.

As is known, in a three-phase motor, the windings of the three phases are identical except for their location on the stator. The number of poles produced by the combined action of all three phases is the same as the number that would be produced by one phase alone. Therefore in FIGURES 3A and 3B only one phase is shown. In FIGURE 3A, a schematic diagram shows the magnetic flux lines establishing 2-pole operation in a stator. FIGURE 3B shows magnetic flux lines for a 4-pole stator. A first winding 21 and a second winding 22 are arranged in a loop to provide magnetic flux lines 23, 24 respectively. Thus, by energizing windings 21 and 22 four magnetic field poles 25, 26, 27, and 28 are provided. On the other hand where only one winding, for example such as 21, is energized only two magnetic field poles are established. In the 4-pole arrangement, one mechanical degree is equal to two electrical degrees. The currents indicated in FIGURE 3 represent one particular instantaneous value. Accordingly, a revolving magnetic field is produced in the stator. For a 2-pole stator, the speed of the revolving field with respect to the stator, in revolutions per second, is equal numerically to the frequency in cycles per second. For a 4-pole arrangement, the speed of the revolving field in revolutions per second is equal numerically to half the frequency. By slowing the speed of revolution of the revolving field, the mechanical speed of the motor will be reduced. However, an increased torque will be provided.

Means providing a variable frequency source of potential is shown in the system in FIGURE 5 and is represented by the generator means 11. Means 11 is belt-driven from engine 10 or can be driven from any other suitable power take-off. Compressor 14 is driven by a motor of the kind being described which is represented in FIGURE 5. Energizing one set of leads 31, 32, 33 provides three-phase, 4-pole operation, i.e., low-speed operation for a given frequency, as compared to 2-pole, high-speed operation for the same given frequency. Two-pole operation is effected by energizing leads 34, 35, 36 while shorting leads 31, 32, 33 together.

Conventional motors can be used for the foregoing purposes. A single-winding motor or a double-winding motor can be employed. It will be understood of course that while only one phase of the winding is shown in the drawings the other two phases will be connected exactly in the same fashion but should be located 120 and 240 electrical degrees respectively from the winding of the first phase. By employing three-phase Y connections the number of leads which need to be brought out can be minimized. Connections for one phase of a single-winding arrangement can be as shown in FIGURE 4. Two-pole high-speed operation is shown in FIGURE 4A. At a given instant of time current flows from terminal T5 to T6 in a continuous path as indicated by the arrows i2. Notice that current in the turns marked W and X forms one magnetic field pole P1 while current in the turns marked Y and Z establishes a second pole P2 of opposite polarity. Terminals T1, T2, and T3 are shorted together to form a neutral Y arrangement.

For 4-pole low-speed motor operation each phase is connected as in FIGURE 4B. At a given instant of time, current flows from terminal T2 to both terminals T5 and T6. Notice that the current divides so that in turns W and X it flows in opposite directions to provide poles P3 and P4 of opposite polarity where a single pole P1 had previously been established. Similarly two poles P5 and P6 are established in the Y and Z turns.

A double-winding motor can, for example, also be used of the type wherein substantially two complete motor windings have been installed in a single stator. When one set of windings is energized the motor will operate as a 4-pole motor and when the other set of windings is used it becomes a 2-pole motor. As the single-winding motor appears to be less expensive, such is to be preferred.

The system is arranged for over-the-road operation or operation from an electrical outlet when standing at a loading dock or platform. In standby operation, suitable power at the dockside may be a three-phase, 60-cycle, 230 volt supply.

The system organization, in addition to motor 12, includes a manually operated switch panel 37. Panel 37 includes four manual switches 38, 39, 40, 41 ganged together to be moved by a control handle 42. Handle 42 is movable to three positions to operate the compressor motor 12 either from engine power or standby power, or to place the system in an "off" condition.

The system includes a speed-control relay coil 43 and armature 44. Armature 44 carries five contactors 45–49. The contactors are each movable between two pairs of contact points designated herein simply as the a and b points together with the number of the contactor. For example, when coil 43 is energized, contactor 45 interconnects contact points 45b and when de-energized, points 45a. Contactors 45, 46, 47 serve to switch motor leads from 4-pole to 2-pole operation and vice versa depending upon the level of operation of the variable frequency voltage being supplied by generator means 11. Contactors 48, 49 serve to short-circuit low-speed leads 31–33 during 2-pole operation and also serve to insure the relatively higher torque 4-pole operation when on standby power. The motor-compressor arrangement is properly rated whereby 4-pole operation on the above standby power serves to drive the compressor at a favorable capacity within its optimum range of speed.

Means serving to sense a predetermined level of operation of generator means 11 includes means controlling a normally closed switch operating speed control relay coil 43.

A relay responsive to a predetermined voltage or frequency level, or a speed responsive centrifugal means set for a given r.p.m. can serve to open-circuit the coil 43. As shown, a relay 50 becomes sufficiently energized at a given voltage via a line 51 and the switch armature 52 to open-circut the coil 43. Relay 50 can also operate at a given frequency since as frequency rises the electromagnetic force in coil 50 also rises to actuate its armature.

Means are provided, in both standby and over-the-road operation, to insure that compressor motor 12 is started in its 4-pole, low-speed configuration so as to utilize the relatively greater torque available. Thus, speed control relay 43 must draw a predetermined current from generating means 11 before it can shift the contactors 44–49 from their $a$ contacts to their $b$ contacts.

Relay 43 is therefore arbitrarily selected so that it will shift its contactors at a voltage level significantly below the switching level required for relay 50, but still will not shift during the initial starting levels of generator operation. An initial starting period of high torque operation is thereby permitted in the over-the-road mode of operation.

In standby, contactor 49 serves to protect the motor.

In over-the-road operation of refrigeration systems it has been found, in one system, that certain advantages and operating efficiencies can be had by employing a "hot gas bypass" line to conduct heat of compression gases directly from the compressor discharge to the evaporator, located within the commodity space. The "hot gas line" by-passes the condenser and serves to heat the evaporator during defrost and space heating periods of operation.

At dockside, such efficiencies are not ordinarily demanded. Thus, after the temperature in the commodity space has been reduced sufficiently, the compressor is merely shut down by the action of a thermostat in the commodity space.

In the system, as shown in FIGURE 5, a circuit responsive to a thermostat in the commodity space serves at a proper time in over-the-road operation to operate a "hot gas line." On the other hand, when taking power from dockside it serves, at a proper time, to shut down the compressor to prevent over-cooling.

Thus, a hot gas solenoid valve 53, thermostat controlled switch 54, and motor contactor relay 55 have been provided for operation as explained in the description of the operation of the system given below.

Operation of the system, when taking power from the belt-driven generator means 11, is as follows.

Handle 42 is in its proper "engine" position. Variable-voltage, variable-frequency power is generated on lines 56, 57, 58 connected respectively by switches 38, 39, 40 to lines 59, 60, 61.

In general, speed control relay 43 is connected across lines 60, 61 by a circuit traced from line 60 to lines 62, 63, coil 43, line 51, normally closed switch 52, and back to line 61 along line 64. At the lower speeds of operation of generator means 11, relay 50 will be de-energized whereby relay 43 will be energized to move contactors 45–49 to the $b$ contacts (high speed, 2-pole motor operation). In this condition lines 59, 60, 61 are interconnected to 34, 35, and 36, respectively. Energizing lines 34–36 serves to operate motor 12 in its high-speed 2-pole configuration.

At a predetermined level of operation, for example as might correspond to 35 miles per hour, or a 60-cycle, 240-volt output for generator 11, motor 12 is switched to its low-speed 4-pole configuration. As the switching level is approached, relay 50 is operated as to open-circuit coil 43. Contactors 45–49 are spring urged (not shown) to their upper position whereby the $a$ contacts are interconnected. Further operation above the predetermined switching level serves to operate motor 12 as a 4-pole configuration whereby power on lines 59, 60, 61 is transmitted to lines 65, 66, 67 leading respectively to leads 33, 32, 31 via leads 68, 69, 70.

As mentioned above high-speed operation can be effected in a motor by merely shorting three leads together to form a neutral. Thus for high-speed operation of motor 12 when relay 43 is energized, contactor 48 couples line 68 to line 70 and contactor 49 couples line 68 to line 69 thereby shorting these three lines 68, 69, 70 together during high-speed motor operation.

When it is desired, in over-the-road operation, to open the "hot gas by-pass line," a thermostat 71 serves to close switch 54 to interconnect lines 72 and 73 to energize hot gas solenoid valve 53. This circuit is traced from line 58 to switch 41, line 72, switch 54 in its "hot gas" position, line 73, relay 53, and return via lines 74, 62, 60, switch 39, and line 57.

Standby operation of the system is as follows:

Three-phase, 60-cycle, 230-volt power is taken from a receptacle 75 at dockside. Motor 12 is operated on its low-speed, 4-pole configuration by power on the three leads 68, 69, 70 coupled respectively to leads 33, 32, 31 via normally open switches 76, 77, 78. The voltage at dockside is sufficiently high to energize relay 50 and thereby coil 43 is de-energized, the contactors remaining in their $a$ position.

In standby operation, the manual switch panel 37 is conditioned whereby switches 38–40 disconnect generator means 11 from the system. Switch 41 is then in position to couple line 72 to a motor protection line 79. Line 79 serves to insure, through contact points 49$a$ and conductor 80, that motor 12 cannot start except in its high torque low-speed configuration. Thus, where it is assumed that temperature in the commodity space is above the desired temperature, and cooling is to be had, motor 12 will be operated by a circuit which first closes the normally open switches 76, 77, 78. This circuit is traced from receptacle 75, where power is taken, along line 80 through contactor 49 in position to interconnect points 49$a$ thereby carrying power to line 79, through switch 41, to line 72. Line 72 is connected through closure of switch 54 to line 81. The motor protection circuit is completed through the coil of relay 55 and back to line 69. This circuit thereby serves to close switches 76–78 if contactor 49 is properly conditioned so as to cause motor 12 to be operated by power applied to leads 31–33. During 4-pole operation of motor 12 on 230 volt standby power, speed-control relay is maintained de-energized.

From the foregoing it will be evident that compressor operation is maintained within an optimum speed range, notwithstanding the fact that the power supply may range between very wide limits considerably exceeding the limits of optimum compressor operation.

Generally speaking, at engine-idling speeds the compressor will put out approximately one third of its rated capacity. As the engine speed increases the compressor speed and capacity will be increased until rated capacity is attained at approximately 35 miles per hour for example in a typical refrigeration truck application using the system. At that point, the motor shifts to low-speed operation resulting in approximately fifty percent capacity. As the truck engine continues to increase speed the capacity again increases until maximum compressor capacity is attained at approximately 65 miles per hour. For standby operation the motor is powered at or near maximum optimum capacity, for 4-pole mode.

It should be evident also from the foregoing that an additional aspect of the system is that it diminishes demands upon the generating means for starting conditions. By starting the compressor motor in its high-torque low-speed configuration, a significant saving in generating means can be effected. For example, a motor of this type has much more starting torque on the low-speed winding than it has on the high-speed winding, or for that matter than does a comparable single-speed motor having four poles. As is known, where an alternator is used, its size is determined by the starting characteristics of the motor.

Usually, an alternator is required to have two-to-four times the rated capacity of the motor. The extra capacity is required only to start the motor. By starting a two-speed motor on the low-speed windings, the reserve capacity of the alternator need be at a minimum. Thus a significant saving in alternator cost is effected.

What is claimed is:

For transport refrigeration, a vehicle engine of a type capable of both idling and propelling a vehicle through a normal range of highway velocities, generating means driven by the engine to provide a source of electric power having a frequency varying with the speed of the engine ranging between first and second limits, said generating means including output connections therefrom, a compressor having an optimum speed range lying within first and second limits well within the first named limits, a multi-speed electric motor driving said compressor, said motor having two-pole mode connections providing a first pair of magnetic field poles serving to operate the motor at high speed operation for a given frequency, and having four-pole mode connections serving to electrically add a second pair of magnetic field poles to said first pair to operate the motor at a lower speed for said given frequency, speed control switch means serving in one condition to operatively couple the generator output connections to said four-pole mode connections and in another condition to operatively couple the generator output connections to said two-pole mode connections, first and second relays operatively coupled to be energized from said output connections, said first relay having a de-energized state serving to establish the four-pole condition of the switch means and having an energized state serving to establish the two-pole condition thereof, said second relay having an energized state serving to de-energize said first relay and having a de-energized state serving to condition said first relay to be energized from said generator output connections, said first relay requiring a first level of generator output in order to shift to the energized state thereof, said first level being significantly below a second generator output level required to switch said second relay to the energized state thereof but yet sufficiently high to permit said first relay to remain in its de-energized state during initial starting levels of operation of the generator, a selector switch electrically between said generator and said relays for decoupling said generator output connections therefrom, auxiliary power connections adapted to be coupled to a dockside source of power, a third relay to be operated by said dockside source of power and serving, when in its energized state, to close said auxiliary power connections, said third relay having a de-energized state serving to open said auxiliary power connections, a motor protection circuit defined via said selector switch and the first named switch means for energizing said third relay only when said first relay is in the de-energized state thereof whereby four-pole operation of the motor is assured under auxiliary power.

References Cited by the Examiner

UNITED STATES PATENTS

| | | | |
|---|---|---|---|
| 971,056 | 9/1910 | Lohr | 318—173 |
| 1,985,639 | 12/1934 | King | 318—106 |
| 2,067,837 | 1/1937 | Frese | 318—106 X |
| 2,089,512 | 8/1937 | Upp | 318—106 X |
| 2,104,383 | 1/1938 | Candor et al. | 318—106 X |
| 2,157,840 | 5/1939 | Whiting et al. | 318—341 X |
| 2,157,926 | 5/1939 | Suits | 318—341 X |
| 2,641,736 | 6/1953 | Jaeschke | 318—148 |

ORIS L. RADER, *Primary Examiner.*